(12) United States Patent
Suenobu et al.

(10) Patent No.: US 7,897,099 B2
(45) Date of Patent: Mar. 1, 2011

(54) METHOD FOR PRODUCING HONEYCOMB STRUCTURE

(75) Inventors: Hiroyuki Suenobu, Nagoya (JP); Yasushi Noguchi, Nagoya (JP); Tomoo Nakamura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1256 days.

(21) Appl. No.: 10/585,190

(22) PCT Filed: Jan. 7, 2005

(86) PCT No.: PCT/JP2005/000112
§ 371 (c)(1),
(2), (4) Date: Jul. 3, 2006

(87) PCT Pub. No.: WO2005/068396

PCT Pub. Date: Jul. 28, 2005

(65) Prior Publication Data
US 2007/0269634 A1  Nov. 22, 2007

(30) Foreign Application Priority Data
Jan. 13, 2004  (JP) ............................. 2004-005596

(51) Int. Cl.
*C04B 26/28* (2006.01)
(52) U.S. Cl. ................. 264/629; 264/630; 264/631
(58) Field of Classification Search ............ 264/630, 264/631, 629
See application file for complete search history.

(56) References Cited

U.S. PATENT DOCUMENTS

| | | | |
|---|---|---|---|
| 4,420,316 A * | 12/1983 | Frost et al. | 55/523 |
| 5,114,644 A * | 5/1992 | Beall et al. | 264/631 |
| 5,262,102 A * | 11/1993 | Wada | 264/631 |
| 6,004,501 A | 12/1999 | Cornelius et al. | |
| 6,048,490 A | 4/2000 | Cornelius et al. | |
| 6,210,626 B1 | 4/2001 | Cornelius et al. | |
| 2003/0143370 A1 | 7/2003 | Noguchi et al. | |

(Continued)

FOREIGN PATENT DOCUMENTS

JP  A 57-028390  2/1982

(Continued)

*Primary Examiner*—Carlos Lopez
(74) *Attorney, Agent, or Firm*—Oliff & Berridge, PLC

(57) ABSTRACT

There is provided a honeycomb structure and a method for producing the honeycomb structure, capable of reducing variance in pore diameter depending on part and capable of increasing the mean pore diameter as a whole. There is provided a method for producing a cordierite honeycomb structure 1 including the step of firing a honeycomb formed body. In the firing step, a temperature rise rate from 1200° C. to 1250° C. is controlled to 40° C./hr or more, a temperature rise rate from 1250° C. to 1300° C. is controlled to 2 to 40° C./hr, and a temperature rise rate from 1300° C. to 1400° C. is controlled to 40° C./hr or more. There is further provided a honeycomb structure having a porosity of 50 to 70%, a mean pore diameter of 15 to 30 µm, a difference in a mean pore diameter of 5 µm or less between in the central portion and in the outer peripheral portion, a thermal expansion coefficient of $1.0 \times 10^{-6}$/° C. or less in each of the central portion and the outer peripheral portion, and an A-axis compression strength of 1.5 MPa or more in each of the central portion and the outer peripheral portion.

2 Claims, 2 Drawing Sheets

U.S. PATENT DOCUMENTS

| | | |
|---|---|---|
| 2003/0151155 A1 | 8/2003 | Muroi et al. |
| 2003/0166450 A1 | 9/2003 | Kumazawa et al. |
| 2005/0120690 A1 | 6/2005 | Noguchi et al. |
| 2007/0119133 A1 * | 5/2007 | Beall et al. .................... 55/523 |

FOREIGN PATENT DOCUMENTS

| | | |
|---|---|---|
| JP | A 02-255576 | 10/1990 |
| JP | A 05-085813 | 4/1993 |
| JP | A 05-085856 | 4/1993 |
| JP | A 11-092214 | 4/1999 |
| JP | B 2981034 | 9/1999 |
| JP | A 2001-519310 | 10/2001 |
| JP | A 2001-334154 | 12/2001 |
| JP | A 2003-040687 | 2/2003 |
| JP | A 2003-212672 | 7/2003 |
| JP | A 2003-277162 | 10/2003 |
| JP | A-2004-000901 | 1/2004 |
| WO | WO 99/18047 | 4/1999 |

* cited by examiner

METHOD FOR PRODUCING HONEYCOMB STRUCTURE

TECHNICAL FIELD

The present invention relates to a honeycomb structure and a method for producing the honeycomb structure. In particular, the present invention relates to a honeycomb structure capable of being used particularly as a filter or a catalyst carrier and a method for producing the honeycomb structure suitably.

BACKGROUND ART

There has recently been used a honeycomb structure as a filter to trap particulate matter (DPF) discharged from a diesel engine to take measures against automobile exhaust gas regulations which become more strict every year. There has also been used a honeycomb structure with a catalyst carried thereon in order to remove nitrogen oxides, sulfur oxides, hydrogen chloride, hydrocarbon, carbon monoxide, and the like, contained in automobile exhaust gas.

Such a honeycomb structure is required to have an enlarged pore diameter and an increased porosity for the purpose of a pressure loss reduction, or the like. A bigger honeycomb structure is also required for purifying exhaust gas from heavy vehicles.

However, a mean pore diameter of a honeycomb structure is increased in a conventional method for producing a honeycomb structure, there is a problem of deterioration in trapping efficiency, for example, when the honeycomb structure is used as a DPF. This problem tends to worsen when an attempt to increase its porosity or enlarge its size is made. In addition, there is a problem of deterioration in isostatic strength and thermal shock resistance in accordance with increase in porosity or size enlargement.

There has been disclosed control of a temperature rise rate from 400 to 1200° C. within a predetermined range in a firing step in a conventional method for producing a honeycomb structure for the purpose of enhancing its isostatic strength and reducing a pressure loss (see, e.g., Patent Document 1). In addition, there has been disclosed control of a temperature rise rate from 1100 to 1200° C. to be 60° C./hr or less and from 1200 to 1300° C. to be 80° C./hr or more for the purpose of obtaining a honeycomb structure having high percentage of water absorption and low thermal expansion coefficient (see, e.g., Patent Document 2).

Further, there has been disclosed control of a temperature rise rate at below 1100° C. to be 250° C./hr and at 1100° C. or more to be 30 to 300° C./hr with using a raw material having a predetermined particle diameter (see, e.g., Patent Document 3).

However, in such conventional methods, it is difficult to inhibit the lowering of trapping efficiency in accordance with enlargement of a mean pore diameter of a honeycomb structure in the case that a honeycomb structure is produced as a filter for a DPF, or the like.

Patent Document 1: Japanese Patent Application No. 2003-277162
Patent Document 2: Japanese Patent No. 2981034
Patent Document 3: Japanese Patent Publication No. 57-28390

DISCLOSURE OF THE INVENTION

The present invention is characterized by providing a method for producing a honeycomb structure, the method being capable of increasing the mean pore diameter as a whole and reducing variance in pore diameter depending on part, and a honeycomb structure having a large pore diameter and reduced variance in pore diameter depending on part.

The present inventors investigated the cause of lowering in trapping efficiency of a cordierite honeycomb structure used for a DPF. As a result, they found out that a pore diameter in a central portion of the honeycomb structure is larger than a pore diameter in an outer peripheral portion and that leakage of soot or the like from the central portion is caused to lower the trapping efficiency.

Further, as a result of detailed investigation into the cause of variance in pore diameter, they found a phenomenon of sudden increase in a temperature rise rate in the central portion of the honeycomb structure due to a great exothermic reaction caused in a cordierite-forming step at 1250 to 1300° C. during the temperature rise in a firing step and that differences in pore diameter, thermal expansion coefficient, and A-axis compression strength are caused due to the difference in a temperature rise rate between in the central portion and in the outer peripheral portion.

Further investigation was made into inhibition of such a phenomenon, and it was found that the exothermic reaction can proceed gently by controlling a temperature rise rate from 1250 to 1300° C. to be 40° C./hr or less, which reduces the difference in pore diameter between in the central portion and in the outer peripheral portion. It was further found that the mean pore diameter of the whole pores can be increased with keeping the small difference in pore diameter between in the central portion and in the outer peripheral portion by controlling a temperature rise rate from 1200 to 1250° C. and from 1300 to 1400° C. to be 40° C./hr or more. Accordingly, they succeeded in obtaining a honeycomb structure having little variance in pore diameter depending on part, small thermal expansion coefficient both in the central portion and the outer peripheral portion, and high isostatic strength.

That is, the present invention provides a method for producing a cordierite honeycomb structure comprising the step of firing a honeycomb formed body, the step comprising control of a temperature rise rate from 1200° C. to 1250° C. to be 40° C./hr or more, from 1250° C. to 1300° C. to be 2 to 40° C./hr, and from 1300° C. to 1400° C. to be 40° C./hr or more.

In the present invention, it is preferable to produce a honeycomb structure having a porosity of 50 to 70%, a mean pore diameter of 15 to 30 μm, and difference in mean pore diameter between in a central portion and in an outer peripheral portion is 5 μm or less. In addition, it is preferable to produce a honeycomb structure having a diameter of 100 mm or more and a length of 100 mm or more. It is further preferable to produce a honeycomb structure having a thermal expansion coefficient of $1.0 \times 10^{-6}$/° C. or less in each of the central portion and the outer peripheral portion and to produce a honeycomb structure having an A-axis compression strength of 1.5 MPa or more in each of the central portion and the outer peripheral portion, and it is particularly preferable to produce a honeycomb structure having an isostatic strength of 1.0 MPa or more.

It is furthermore preferable that firing is performed after inserting slurry for plugging into the unfired formed body under pressure.

According to the present invention, there is further provided a honeycomb structure made of cordierite and having a porosity of 50 to 70%, a mean pore diameter of 15 to 30 μm, a difference in a mean pore diameter of 5 μm or less between in the central portion and in the outer peripheral portion, a thermal expansion coefficient of $1.0 \times 10^{-6}$/° C. or less in each of the central portion and the outer peripheral portion, and an A-axis compression strength of 1.5 MPa or more in each of the central portion and the outer peripheral portion. It is further preferable that the honeycomb structure has an isostatic strength of 1.0 MPa or more.

By controlling a temperature rise rate in the firing step as described above, a mean pore diameter of the honeycomb structure can be increased, and a difference in pore diameter between in the central portion and in the outer peripheral portion can be reduced. In addition, even if an attempt to increase porosity or enlarge size of the honeycomb structure is made, variance in pore diameter can be inhibited Further, the honeycomb structure can have a small thermal expansion coefficient in all parts thereof and an improved A-axis compression strength and improved isostatic strength.

In addition, by controlling each of a porosity, a mean pore diameter, a difference in mean pore diameter between in the central portion and in the outer peripheral portion, a thermal expansion coefficient each in the central portion and in the outer peripheral portion, and an A-axis compression strength, and preferably an isostatic strength of the honeycomb structure to be within a predetermined range, the honeycomb structure can have a small pressure loss, high trapping efficiency, and improved durability against heat and pressure in the case of using the honeycomb structure as a DPF, for example.

REFERENCE NUMERALS

1 . . . honeycomb structure, 2 . . . partition wall, 2a . . . partition wall in the central portion, 2b . . . partition wall in the outer peripheral portion, 3 . . . cell, 4 . . . plugged portion, 5 . . . point of the center of gravity, 42 . . . end face, 44 . . . end face

BEST MODE FOR CARRYING OUT THE INVENTION

The present invention will hereinbelow be described on the basis on embodiments. However, the present invention is by no means limited to these embodiments. Incidentally, though the present invention will be described with a honeycomb structure for a DPF as an example, the present invention is characterized in that an average pore diameter is increased, that variance in mean pore diameter depending on a part is inhibited, that a thermal expansion coefficient can be lowered in all parts of the honeycomb structure, that a material strength represented by an A-axis compression strength can be improved, and that an isostatic strength can be improved and in that such a honeycomb structure is provided, and such characteristics can suitably be applied not only to a honeycomb structure for a DPF, but also to a general cordierite porous honeycomb structure such as a catalyst carrier.

Figure 1A:
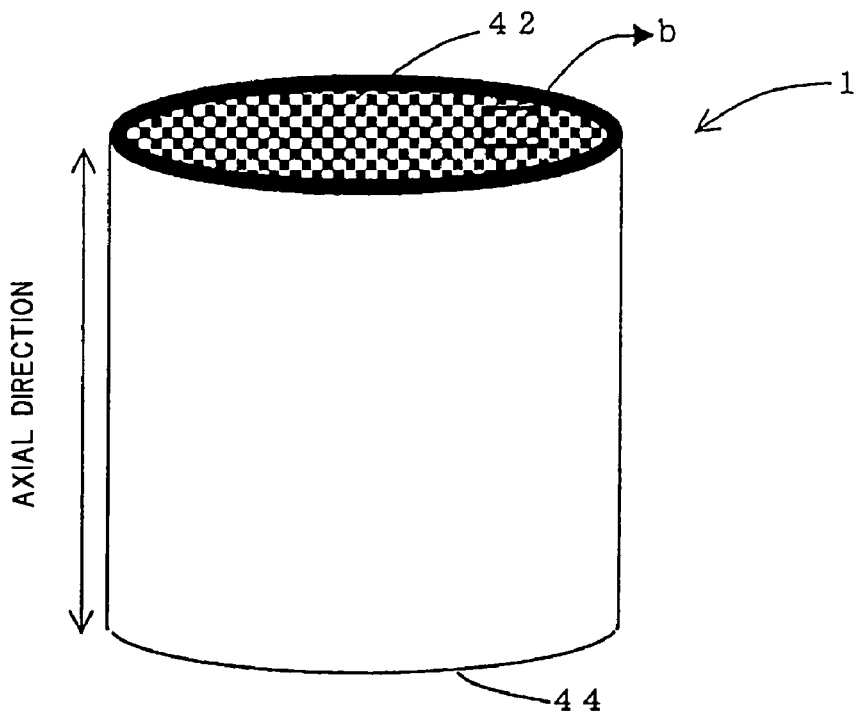
FIG. 1(a) is a schematic perspective view showing an example of a honeycomb structure of the present invention.
Figure 1B:
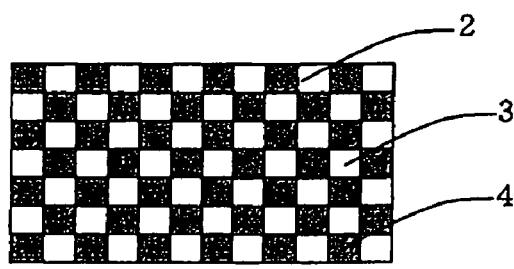
FIG. 1(b) is a partially enlarged plan view where b portion of FIG. 1(a) is enlarged.
Figure 1C:
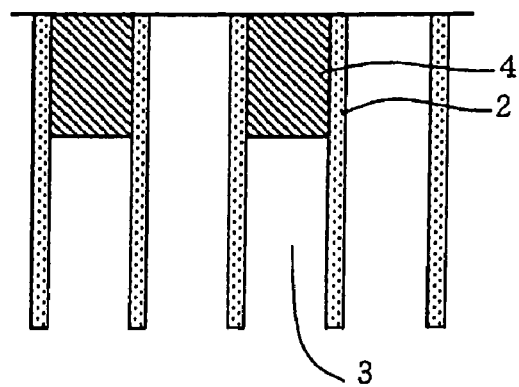
FIG. 1(c) is a partially enlarged view schematically showing a part of a section parallel with an axial direction of the honeycomb structure shown in FIG. 1(a).

FIG. 1(a) is a schematic perspective view showing an example of a cordierite honeycomb structure for a DPF. FIG. 1(b) is a partially enlarged plan view where b portion of FIG. 1(a) is enlarged. FIG. 1(c) is a partially enlarged view schematically showing a part of a section parallel with an axial direction of the honeycomb structure shown in FIG. 1(a). The honeycomb structure 1 shown in FIGS. 1(a) to 1(c) is provided with partition walls 2 disposed so as to form a plurality of cells 3 extending in an axial direction from one end face 42 to the other end face 44. The honeycomb structure 1 is also provided with plugged portions 4 disposed so as to plug the cells 3 in one of the end faces. By this constitution, exhaust gas flowing from one end face 42 into the cells 3 passes though the porous partition walls 2 and discharged from the other end face 44 via the adjacent cells 3. At this time, the partition walls 2 serve as filters and trap PM such as soot. Incidentally, when a honeycomb structure is used as a catalyst carrier or the like, it does not need plugged portions, and the present invention is intended for both a honeycomb structure with plugged portions and a honeycomb structure without plugged portions. In addition, a cordierite honeycomb structure means a honeycomb structure in which 50% by mass or more of substances constituting the partition walls is cordierite, preferably 70% by mass or more, and particularly preferably 90% by mass or more.

Such a cordierite honeycomb structure can be produced by firing a honeycomb formed body containing a cordierite-forming raw material as a raw material to be fired. A "cordierite-forming raw material" means a raw material which becomes a cordierite by firing and a ceramic raw material having a chemical composition with $SiO_2$ of 42 to 56% by mass, $Al_2O_3$ of 30 to 45% by mass, and MgO of 12 to 16% by mass. Specifically, a raw material containing a plurality of inorganic raw materials selected from the group consisting of talc, kaolin, calcined kaolin, alumina, aluminum hydroxide, and silica at a ratio of the above chemical composition.

The honeycomb formed body generally contains a processing aid and a dispersion medium besides a cordierite-forming raw material. Examples of the processing aid include: binders such as hydroxypropylmethyl cellulose, methyl cellulose, hydroxyethyl cellulose, carboxylmethyl cellulose, polyvinyl alcohol, polyethylene telephthalate, polyethylene, and glycerol; dispersants such as ethylene glycol, dextrin, fatty acid soap, and polyalcohol; and pore forming agents such as graphite, wheat flour, starch, phenol resin, polymethyl methacrylate, polyethylene terephthalate, unfoamed foaming resin, foamed forming resin, and water-absorbing polymer. It is preferable that one or a combination of these may be contained according to the purpose. As the dispersion medium, water is generally used.

Such a formed body is preferably dried before firing. Drying is performed to remove water and the dispersion medium contained in the formed body. There is no particular limitation on a drying method, and hot air drying, microwave drying, dielectric drying, drying under reduced pressure, or vacuum drying is generally employed. However, among them, it is preferable to perform drying in a drying step where a combination of microwave drying and dielectric drying is employed in that the entire body can be dried quickly and uniformly. Drying temperature of hot air drying is preferably within the range from 80 to 150° C. in that it can be dried quickly.

Firing can be performed by putting the honeycomb formed body in a firing furnace, raising atmospheric temperature up to a predetermined temperature, and maintaining the temperature for a predetermined time. Since the influence of a temperature rise rate on a pore diameter is small within the temperature range from initial temperature to 1200° C., there is no particular limitation on the temperature rise rate as long as no firing cracks are caused at the temperature rise rate.

Such a temperature rise rate depends on a shape or the like of the formed body, and those skilled in the art can suitably select the rate. For example, as for a temperature rise rate it is preferably 500° C./hr or less, more preferably 300° C./hr or less, and particularly preferably 200° C./hr or less. On the other hand, from the viewpoint of productivity, it is preferably 2° C./hr or more, more preferably 5° C./hr or more, and particularly preferably 10° C./hr or more.

Temperature is raised at a temperature rise rate of 40° C./hr or more within the temperature range from 1200° C. to 1250° C., 2° C. to 40° C./hr or more within the temperature range from 1250° C. to 1300° C., and 40° C./hr or more within the temperature range from 1300° C. to 1400° C.

As described above, by controlling a temperature rise rate in the temperature range from 1250° C. to 1300° C. to be 40° C./hr or less, a difference in pore diameter between in the central portion and in the outer peripheral portion can be reduced. To reduce the difference in pore diameter, the temperature rise rate is preferably below 40° C./hr, more preferably 30° C./hr or less, and particularly preferably 20° C./hr or less. On the other hand, the temperature rise rate is necessarily 2° C./hr or more, preferably 3° C./hr or more, and more preferably 5° C./hr or more.

On the other hand, a pore diameter can be increased by raising the temperature rise rate within the temperature range from 1200° C. to 1400° C. Therefore, by controlling a temperature rise rate in the temperature ranges from 1200° C. to 1250° C. and from 1300° C. to 1400° C. to be 40° C./hr or more, a pore diameter can be increased as a whole. In addition, since a temperature rise rate in the temperature range from 1250° C. to 1300° C. is controlled to be 40° C./hr or less as described above, a honeycomb structure has less variance in pore diameter depending on a part. Therefore, for example, in the case that such a honeycomb structure is used a DPF, an attempt to reduce a pressure loss and to raise trapping efficiency can be made. The temperature rise rate in the temperature ranges from 1200° C. to 1250° C. and from 1300° C. to 1400° C. is preferably 45° C./hr or more, more preferably 50° C./hr or more from the viewpoint of further increasing the entire pore diameters.

Further, by thus controlling temperature, the honeycomb structure can have a small thermal expansion coefficient in all parts thereof and an improved A-axis compression strength and improved isostatic strength. This is considered because formation of pores having uneven diameters and formation of uneven cordierite crystals can be inhibited by inhibiting rapid temperature rise due to exothermic reaction in a cordierite-forming process. Therefore, it is considered that a cordierite having pores having more uniform diameters and excellent crystal conditions, that thermal expansion coefficient can be reduced in all parts thereof, that A-axis compression strength can be improved, and that isostatic strength can be improved.

The highest temperature of firing is preferably about 1400 to 1440° C., and the temperature is preferably maintained for 2 to 20 hours. There is no particular limitation on a temperature rise rate in the temperature range from 1400° C. to the highest firing temperature. However, when the temperature rise rate is too high, the honeycomb structure may be damaged by melting due to overshooting. Therefore, the rate is preferably 50° C./hr or less. Incidentally, a temperature rise rate means an average temperature rise rate in each temperature range.

When a honeycomb structure having relatively high porosity is produced, variance in pore diameter depending on part tends to be large. However, in such a firing step, a honeycomb structure having a large mean pore diameter and a small difference in mean pore diameter between in the central portion and in the outer peripheral portion. It is preferable that a honeycomb structure produced in the present invention has a porosity of 50 to 70%, a mean pore diameter of 15 to 30 μm, and a difference in mean pore diameter between in the central portion and in the outer peripheral portion is 5 μm or less. This range is preferable because both a low pressure loss and high trapping efficiency can be attempted in the range particularly in the case of a honeycomb structure for a DPF. In addition, a honeycomb structure having characteristics in such ranges can have a thermal expansion coefficient of $1.0 \times 10^{-6}$/° C. or less and an A-axis compression strength of 1.5 MPa or more in each of the central portion and the outer peripheral portion and an isostatic strength of 1.0 MPa or more. It is preferable to produce such a honeycomb structure.

Figure 2:
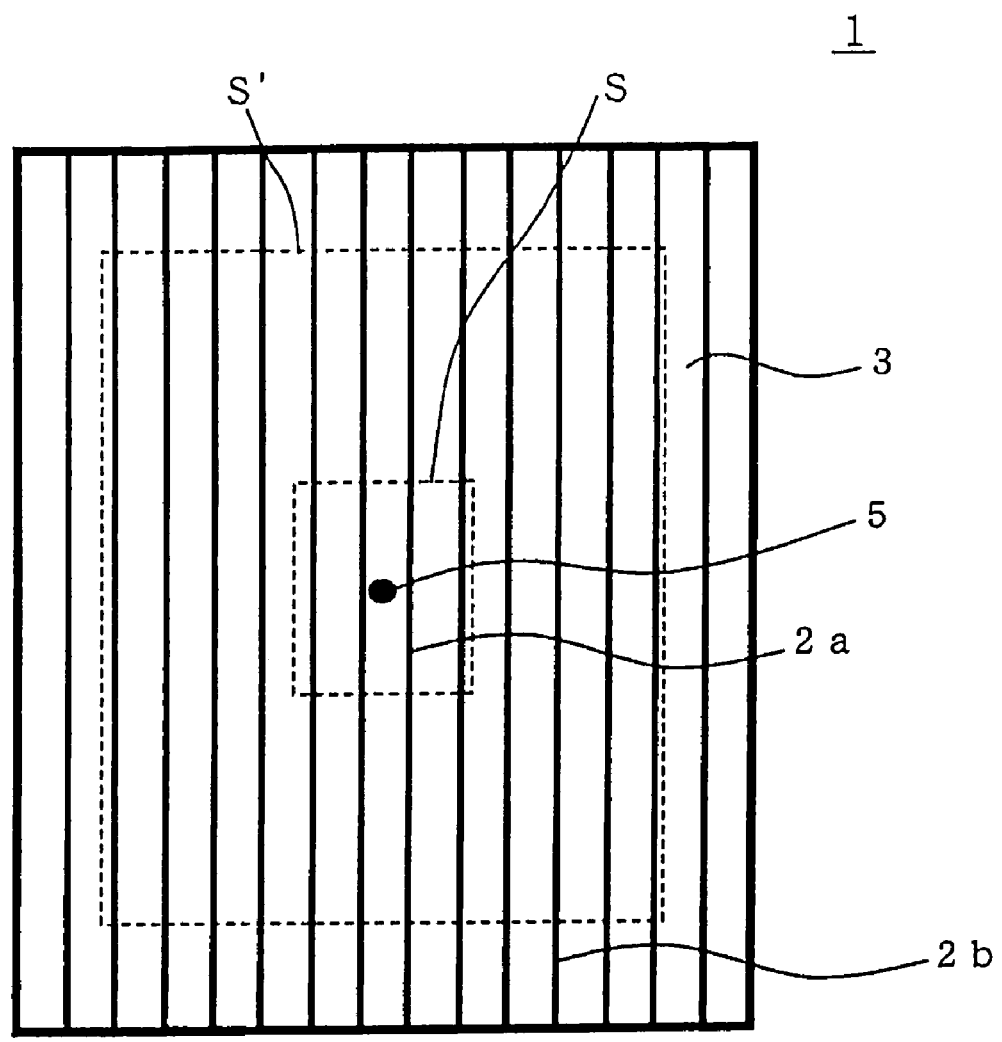
FIG. 2 is a schematic sectional view parallel with an axial direction and showing another example of a honeycomb structure of the present invention.

Here, a mean pore diameter and porosity of a honeycomb structure mean the mean pore diameter and porosity, respectively, of the entire partition walls 2 shown in FIG. 1(c). In addition, a mean pore diameter, porosity, thermal expansion coefficient, and A-axis compression strength in the central portion mean the mean pore diameter, porosity, thermal expansion coefficient, and A-axis compression strength, respectively, of the central portion which is inside a similar figure S which is 1/64 of the volume of the honeycomb structure 1 with the central point 5 of the volume of the honeycomb structure 1 as the center as shown in FIG. 2. A mean pore diameter, porosity, thermal expansion coefficient, and A-axis compression strength in the outer peripheral portion the mean pore diameter, porosity, thermal expansion coefficient, and A-axis compression strength, respectively, of the outer peripheral portion which locates outside a similar figure S' which is 27/64 of the volume of the honeycomb structure 1 with the central point 5 of the volume of the honeycomb structure 1 as the center as shown in FIG. 2. Incidentally, FIG. 2 is a sectional view schematically showing a section parallel with an axial direction of a honeycomb structure.

The porosity and the pore diameter were measured with a mercury porosimeter, and the thermal expansion coefficient was measured in the range from 40 to 800° C. according to JIS R1618. The A-axis compression strength was measured with a compression tester conformable to JIS 7733 according to JASO standard M505-87 issued by the Society of Automotive Engineers of Japan. The isostatic strength is shown by a value of pressure applied when the honeycomb structure broke according to JASO standard M505-87.

As another embodiment, the present invention can be applied to a large-sized honeycomb structure. Since a large-sized honeycomb structure tends to have large differences in porosity, thermal expansion coefficient, and material strength represented by A-axis compression strength between in the central portion and in the outer peripheral portion, it is preferable to reduce the differences by the aforementioned method. A preferable example to which the method is applied in this case is a honeycomb structure having a diameter of 100 mm or more and a length of 100 mm or more, more preferably a diameter of 140 mm or more and a length of 150 mm or more, and particularly preferably a diameter of 140 to 350 mm and a length of 150 to 400 mm.

There is no particular limitation on a method for forming a honeycomb formed body in the present invention, and a honeycomb formed body can be formed in the following method, for example. A cordierite-forming raw material, a processing aid, and a dispersion medium described above are mixed together and kneaded to obtain clay, which is then formed to have a honeycomb shape. The mixing can be performed with a commonly used mixer. The kneading can be performed with a kneader such as a commonly used kneader, a pressure kneader, a monoaxial continuous extruder, a biaxial continuous kneading extruder, and vacuum kneader. Though the forming can be performed by any of known methods such as extrusion forming, injection forming, and press forming, extrusion forming is preferable in forming a honeycomb structure. It is also preferable to perform a clay preparation step and a forming step continuously with an extruder such as a biaxial continuous kneading extruder.

In the case of producing a honeycomb structure for a filter such as a DPF, plugged portions are formed. The plugged portions can be formed as follows. A ceramic powder is prepared, and a binder, a dispersant, and a dispersion medium such as water and glycerin are added to the ceramic powder to give a slurried material, which is put in a container having an open top. On one end face of a honeycomb formed body, openings of predetermined cells are masked with a film or the like. The masked end face of the formed body is oriented downward and immersed in the slurry in the container. Further, by pressing the honeycomb formed body from the top, the cells without masks can be plugged with the slurry with a predetermined depth.

The same steps can be applied to the other end face. It is preferable that the plugged portions are disposed alternately in both end faces so that plugged cells and unplugged cells form a checkerwise pattern in each end face. Though there is no particular limitation on ceramics for constituting the plugged portions, a cordierite-forming raw material is preferable in consideration of adhesiveness with the partition walls in the periphery thereof. Performing these steps on a formed body is better than on a honeycomb structure after firing. In the case of performing these steps on a formed body, plugged portions are formed in the following firing step. In the case of performing these steps on a honeycomb structure after firing, plugging portion cannot be formed until the honeycomb structure is fired again. Thus, the number of man-hour is increased in this case than the case of performing plugging on a formed body. In addition, in the case of performing plugging on a formed body, firing is performed in the state that end face portions are reinforced. Therefore, generation of cracks can be inhibited in the firing step. Further, since the honeycomb structure and plugged portions bonds together more firmly due to a cordierite-forming reaction, plugged portions are inhibited from slipping off from the honeycomb structure due to pressure by engine exhaust gas or pressure by back washing.

As a honeycomb structure suitably produced by the aforementioned method, there is a honeycomb structure having a porosity of 50 to 70%, a mean pore diameter of 15 to 30 μm, a difference in mean pore diameter between in the central portion and in the outer peripheral portion of 5 μm or less, and a thermal expansion coefficient in both the central portion and the outer portion of $1.0 \times 10^{-6}/°$ C. or less, preferably $0.9 \times 10^{-6}/°$ C. or less, and more preferably $0.8 \times 10^{-6}/°$ C. or less. Such a honeycomb structure shows good thermal shock resistance as well as low pressure loss, and high trapping efficiency. In addition, the honeycomb structure preferably has an A-axis compression strength is 1.5 MPa or more in both the central portion and the outer peripheral portion, more preferably 1.7 MPa or more, particularly preferably 2.0 MPa or more. Since such a honeycomb structure does not have a part having particularly low strength in the structure, it shows high isostatic strength. The isostatic strength is preferably 1.0 MPa or more, more preferably 1.2 MPa or more, and particularly preferably 1.5 MPa or more. Such a honeycomb structure shows good durability with breakage upon canning and practical use being inhibited.

There is no particular limitation on a shape of a honeycomb structure of the present invention. For example, a honeycomb structure may have any shape such as a circle, an oval, a race track, and a hexagon in a section perpendicular to the axial direction. There is no particular limitation on a cell shape, and any sectional shape, for example, a polygon such as a triangle, a rectangular, and a hexagon, a circle, or an oval can be employed. There is no particular limitation on cell density, and the cell density is, for example, 50 to 600 cells/in$^2$ (7.8 to 93 cells/cm$^2$), preferably about 100 to 500 cells/in$^2$ (15.5 to 77.5 cells/cm$^2$). There is no particular limitation on thickness of partition walls, and the thickness is, for example, 50 to 650 μm, preferably 75 to 500 μm, more preferably about 100 to 450 μm.

Further, a catalyst can be carried on porous partition walls of the honeycomb structure. Examples of the catalyst includes noble metals such as Pt, Pd, and Rh, nonmetals such as a perovskite type catalyst. At least one of them can be carried on a honeycomb structure. The catalyst can be carried by a conventionally known method such as wash coating.

EXAMPLE

The present invention will hereinbelow be described in more detail on the basis of Examples. However, the present invention is by no means limited to these Examples.

(Method of Evaluation)

Mean pore diameter: Mean pore diameter was measured with a mercury porosimeter produced by Micromeritics Co., Ltd.

Porosity: Volume of the entire pores was measured with a mercury porosimeter produced by Micromeritics Co., Ltd., and porosity was calculated from the volume of the entire pores with true specific gravity of cordierite of 2.52 g/cc.

Thermal expansion coefficient: Samples cut out from portions 2a and 2b of FIG. 2 were measured according to JIS R1618 in the temperature range from 400 to 800° C.

A-axis compression strength: A-axis compression strength test samples were cut out from 2a and 2b of FIG. 2 by a method according to JASO standard M505-87, a breaking load was obtained with a compression tester conformable to JIS B7733, and the breaking load was divided by the pressed area.

Isostatic strength: Isostatic strength was measured by the following method according to JASO standard M505-87. Both the end faces of a honeycomb structure were covered with a metallic plate having the same diameter as the end faces of the honeycomb structure. After the metallic plate was fixed with covering the outer peripheral surface of the honeycomb structure with a rubber tube having the same diameter, a rubber tape was attached to the rubber tube and in the periphery thereof to close up lest water should enter the honeycomb structure. The honeycomb structure was put in water in this state, and water pressure was raised until the honeycomb structure broke. Isostatic strength was obtained from the water pressure that broke the honeycomb structure.

Soot trapping efficiency: Exhaust gas containing soot generated by a soot generator was passed through the honeycomb structures obtained in Examples and Comparative Examples until 1 g/L of soot accumulated. The soot contained in the exhaust gas passed through the honeycomb structures was trapped with a filter, and weight ($W^1$) of the soot was measured. Meanwhile, Soot generated by a soot generator for the same period of time was trapped without passing the exhaust gas containing the soot through the honeycomb structure, and weight ($W^2$) of the soot was measured. Next, each of the weight ($W^1$) and weight ($W^2$) was substituted for $W^1$ and $W^2$ of the following formula (1) to obtain trapping efficiency.

$$(W^2-W^1)/(W^2) \times 100 \qquad \text{Formula (1)}$$

Soot trapping pressure loss: A ring having an inner diameter of 130 mm was attached with pressure to each of the end faces of each of the honeycomb structures obtained in Examples and Comparative Examples. Soot generated by the soot generator was allowed to flow into the range of a diameter of 130 mm of the honeycomb structure, and soot of 1 g/L was trapped. Subsequently, in the state that the soot was trapped in the honeycomb structure, air of 2.27 Nm³/min was sent, and a difference in pressure between in front and at the back of the honeycomb structure was measured to evaluate the pressure loss in the state that soot was trapped.

Example 1

A cordierite-forming raw material, a foaming resin, a binder, and a surfactant shown in the batch No. 1 in Table 1 were mixed together with spraying water of the compounding ratio shown in Table 1. The mixture was kneaded with a kneader to give clay having plasticity. The clay was formed to have a cylindrical shape with a vacuum kneader and put in an extrusion forming machine to have a honeycomb shape. Then, the resultant formed body was subjected to microwave drying, and subsequently hot air drying to be completely dried. The formed body was cut at both ends to have a predetermined size. Then, using slurry constituted by a cordierite raw material having the same composition as the batch No. 1, cells were alternately plugged in both end faces. Finally, temperature was raised at 10° C./hr from the normal temperature to 400° C., 50° C./hr from 400° C. to 1200° C., and, as shown in Table 2, 50° C./hr from 1200° C. to 1250° C., 2° C./hr from 1250° C. to 1300° C., 50° C./hr from 1300° C. to 1400° C., and 20° C./hr to top temperature of 1420° C. to avoid damages of melting of the product by overshoot. Then, the firing was performed at 1420° C. for five hours to obtain a cylindrical honeycomb structure having a diameter of 144 mm and a length of 152 mm with a partition wall thickness of 300 μm, and a cell density of 300 cells/inch² (about 46.5 cells/cm²).

Examples 2 to 7 and Comparative Examples 1 to 6

Each of the honeycomb structures was obtained in the same manner as in Example 1 except for the compounding ratio shown in Table 1 and/or the temperature rise rate shown in Table 2.

The honeycomb structures obtained were evaluated by the above evaluation method with regard to porosity in both the central portion and the outer peripheral portion, mean pore diameter both in the central portion and the outer peripheral portion, thermal expansion coefficient both in the central portion and the outer peripheral portion, A-axis compression strength both in the central portion and the outer peripheral portion, isostatic strength, soot trapping pressure loss, and soot trapping efficiency. The results are shown in Table 2.

TABLE 1

| Batch No. | Cordierite-forming raw material | | | | | Foaming resin | Binder | Surfactant | Water |
|---|---|---|---|---|---|---|---|---|---|
| | Talc | Kaolin | Alumina | Aluminum hydroxide | Silica | | | | |
| 1 | 40 (25 μm) | 20 (5 μm) | 15 (5 μm) | 15 (5 μm) | 10 (30 μm) | 2.0 (40 μm) | 6.0 | 0.2 | 34 |
| 2 | 40 (25 μm) | 20 (5 μm) | 15 (5 μm) | 15 (5 μm) | 10 (30 μm) | 1.0 (40 μm) | 6.0 | 0.2 | 33 |
| 3 | 40 (25 μm) | 20 (5 μm) | 15 (5 μm) | 15 (5 μm) | 10 (30 μm) | 0.5 (40 μm) | 6.0 | 0.2 | 32 |

[Unit: parts by mass]
Note:
Numbers in ( ) show mean particle size.

TABLE 2

| | Batch No. | Temperature rise rate (° C./hr) | | | Porosity (%) | | Pore diameter (μm) | | Thermal expansion coefficient ($10^{-6}$/° C.) | | A-axis compression strength (MPa) | | Isostatic strength (MPa) | Soot trapping pressure loss (kPa) (soot 1 g/L upon accumulation) | Soot trapping efficiency (soot 1 g/L upon accumulation) |
|---|---|---|---|---|---|---|---|---|---|---|---|---|---|---|---|
| | | 1200° C. to 1250° C. | 1250° C. to 1300° C. | 1300° C. to 1400° C. | Central portion | Outer Peripheral portion | Central portion | Outer Peripheral portion | Central portion | Outer Peripheral portion | Central portion | Outer Peripheral portion | | | |
| Ex. 1 | 1 | 50 | 2 | 50 | 66 | 65 | 19 | 18 | 0.3 | 0.3 | 2.9 | 2.9 | 1.9 | 4.7 | 93 |
| Ex. 2 | 1 | 50 | 15 | 50 | 66 | 65 | 23 | 21 | 0.5 | 0.5 | 2.3 | 2.4 | 1.5 | 4.4 | 92 |
| Ex. 3 | 1 | 50 | 30 | 50 | 66 | 65 | 27 | 23 | 0.8 | 0.7 | 2.0 | 2.3 | 1.3 | 4.2 | 91 |
| Ex. 4 | 1 | 100 | 2 | 100 | 65 | 64 | 23 | 22 | 0.4 | 0.4 | 2.3 | 2.4 | 1.5 | 4.3 | 92 |
| Ex. 5 | 1 | 100 | 30 | 100 | 65 | 64 | 30 | 26 | 0.9 | 0.8 | 1.7 | 2.1 | 1.1 | 3.7 | 90 |
| Ex. 6 | 2 | 50 | 15 | 50 | 53 | 53 | 19 | 18 | 0.4 | 0.4 | 10.1 | 10.4 | 6.7 | 5.8 | 94 |
| Ex. 7 | 3 | 50 | 15 | 50 | 45 | 45 | 18 | 18 | 0.3 | 0.3 | 15.6 | 15.7 | 10.4 | 7.0 | 95 |
| Comp. Ex. 1 | 1 | 50 | 50 | 50 | 66 | 65 | 43 | 24 | 1.2 | 1.0 | 0.8 | 2.3 | 0.5 | 3.6 | 75 |
| Comp. Ex. 2 | 1 | 30 | 50 | 50 | 66 | 65 | 36 | 19 | 1.2 | 1.1 | 1.1 | 2.8 | 0.7 | 3.5 | 83 |
| Comp. Ex. 3 | 1 | 30 | 30 | 50 | 66 | 65 | 17 | 14 | 0.9 | 0.8 | 3.0 | 3.3 | 2.0 | 6.0 | 94 |
| Comp. Ex. 4 | 1 | 30 | 50 | 30 | 66 | 66 | 32 | 14 | 1.1 | 1.0 | 1.4 | 3.2 | 0.9 | 5.6 | 88 |
| Comp. Ex. 5 | 1 | 50 | 30 | 30 | 67 | 66 | 16 | 14 | 0.8 | 0.7 | 3.2 | 3.4 | 2.1 | 6.1 | 95 |
| Comp. Ex. 6 | 1 | 30 | 30 | 30 | 67 | 67 | 12 | 11 | 0.8 | 0.8 | 3.6 | 3.8 | 2.4 | 6.9 | 96 |

As shown in Table 2, the production methods of Examples 1 to 7 provided honeycomb structures each having a small difference in mean pore diameter between in the central portion and in the outer peripheral portion with a relatively large mean pore diameter. On the other hand, the production methods of Comparative Examples 1, 2, and 4 provided honeycomb structures each having a large difference in mean pore diameter between in the central portion and in the outer peripheral portion because of the high temperature rise rate within the temperature range from 1250° C. to 1300° C. In addition, the production methods of Comparative Examples 3, 5, and 6 provided honeycomb structures each having small pore diameters in the entire structure because of the small temperature rise rates within the temperature range from 1200° C. to 1250° C. and/or 1300° C. to 1400° C. Therefore, it is understood that it is possible to increase the mean pore diameter of the entire honeycomb structure and to decrease the difference in mean pore diameter in both the central portion and the outer peripheral portion of the honeycomb structure by setting a temperature rise rate within the temperature range from 1250° C. to 1300° C. to be 40° C./hr or less, and from 1200° C. to 1250° C. and from 1300° C. to 1400° C. to be 40° C./hr or more. Further, as shown in Examples 1 to 6, controlling the porosity and mean pore diameter to be within a predetermined range provided honeycomb structures each has a small thermal coefficient, high A-axis compression strength, high isostatic strength, low pressure loss, and high trapping efficiency and is suitably usable as a DPF.

INDUSTRIAL APPLICABILITY

The production method of the present invention can produce a cordierite honeycomb structure having small variance in mean pore diameter depending on part and having a large mean pore diameter as a whole. Such a honeycomb structure can suitably be used in various fields such as catalyst carriers, including a filter for a DPF or the like.

The invention claimed is:

1. A method for producing a cordierite honeycomb structure comprising the step of firing a honeycomb formed body, the step comprising:

for a temperature range from 1200° C. to 1250° C., using a first temperature rise rate;

for a temperature range from 1250° C. to 1300° C., using a second temperature rise rate;

for a temperature range from 1300° C. to 1400° C., using a third temperature rise rate; and the second temperature rise rate being smaller than both the first and third temperature rise rates, wherein the first and third temperature rise rates are equal to or greater than 50° C./hour, and the second temperature rise rate is between 2 and 30° C./hour.

2. A method for producing a honeycomb structure according to claim 1, wherein firing is performed after inserting slurry for plugging into the formed body under pressure.

* * * * *